US007650347B2

(12) United States Patent
Mankovski et al.

(10) Patent No.: US 7,650,347 B2
(45) Date of Patent: Jan. 19, 2010

(54) SYSTEM AND METHOD FOR JOB SCHEDULING AND DISTRIBUTING JOB SCHEDULING

(75) Inventors: Serguei Mankovski, Markham (CA); Hans-Arno Jacobsen, Toronto (CA); Eli Fidler, Toronto (CA); David Matheson, Toronto (CA); Pengcheng Wan, Toronto (CA); Alex Cheung, North York (CA); Guoli Li, Toronto (CA)

(73) Assignee: Computer Associates Think, Inc., Islandia, NY (US)

( * ) Notice: Subject to any disclaimer, the term of this patent is extended or adjusted under 35 U.S.C. 154(b) by 248 days.

(21) Appl. No.: 11/239,334

(22) Filed: Sep. 30, 2005
(Under 37 CFR 1.47)

(65) Prior Publication Data

US 2006/0225075 A1 Oct. 5, 2006

Related U.S. Application Data

(60) Provisional application No. 60/614,492, filed on Oct. 1, 2004.

(51) Int. Cl.
*G06F 7/00* (2006.01)
*G06F 17/00* (2006.01)
(52) U.S. Cl. ............................... 707/100; 707/1; 707/2; 707/10; 709/203
(58) Field of Classification Search ........................ None
See application file for complete search history.

(56) References Cited

U.S. PATENT DOCUMENTS

| | | | | |
|---|---|---|---|---|
| 6,427,170 B1 * | 7/2002 | Sitaraman et al. | ........... | 709/226 |
| 6,847,970 B2 * | 1/2005 | Keller et al. | ................ | 707/100 |
| 7,240,324 B2 * | 7/2007 | Casati et al. | ................ | 717/103 |
| 2002/0143669 A1 * | 10/2002 | Scheer | ......................... | 705/28 |
| 2002/0161674 A1 * | 10/2002 | Scheer | ......................... | 705/28 |
| 2002/0184070 A1 * | 12/2002 | Chen et al. | ...................... | 705/9 |
| 2003/0009463 A1 * | 1/2003 | Gallant | ......................... | 707/10 |
| 2003/0120704 A1 * | 6/2003 | Tran et al. | ..................... | 709/104 |
| 2003/0191679 A1 * | 10/2003 | Casati et al. | .................... | 705/8 |
| 2003/0191795 A1 * | 10/2003 | Bernardin et al. | ........... | 709/105 |
| 2004/0117802 A1 * | 6/2004 | Green | ......................... | 719/318 |
| 2005/0015511 A1 * | 1/2005 | Izmailov et al. | ............. | 709/238 |
| 2005/0015619 A1 * | 1/2005 | Lee | .............................. | 713/201 |
| 2005/0044173 A1 * | 2/2005 | Olander et al. | .............. | 709/217 |
| 2005/0097146 A1 * | 5/2005 | Konstantinou et al. | ...... | 707/200 |
| 2005/0216555 A1 * | 9/2005 | English et al. | .............. | 709/204 |
| 2005/0257221 A1 * | 11/2005 | Inchingolo et al. | .......... | 718/100 |

(Continued)

OTHER PUBLICATIONS

Peer-to-peer overlay broker networks in an event-based middleware, Pietzuch et al., Distributed event-based systems: Proceedings of the 2nd international workshop on Distributed event-based systems; Jun. 8-8, 2003.*

* cited by examiner

*Primary Examiner*—Tim T. Vo
*Assistant Examiner*—Jay A Morrison
(74) *Attorney, Agent, or Firm*—Pillsbury Winthrop Shaw Pittman LLP

(57) ABSTRACT

The invention relates to a system and a method for tracking and executing a job comprising a series of tasks. Each task is executable on a separate computing device. The method comprises: utilizing a workload manager to identify an initial schedule of implementation for the job; utilizing agents to selectively control execution of the tasks; and for each agent, utilizing a publish/subscription interface to isolate communications of the workload manager from each agent and to communicate with other publish/subscription interfaces of other agents to determine when to activate its task. The interface utilizes a broker adapted to communicate with other brokers to disseminate communications amongst the agents.

22 Claims, 14 Drawing Sheets

SYSTEM AND METHOD FOR JOB SCHEDULING AND DISTRIBUTING JOB SCHEDULING

RELATED APPLICATION

This application claims the benefit of U.S. Provisional Patent Application Ser. No. 60/614,492, filed on Oct. 1, 2004, the contents of which are hereby incorporated by the refrence in their entirety.

FIELD OF THE INVENTION

The present invention relates to a system and method for managing, scheduling, controlling, and monitoring execution of jobs by a job scheduler.

BACKGROUND

Job scheduling systems provide a centralized system in hardware and software for processing large scale tasks. Typically, large scale tasks are broken down into several smaller tasks which are individually, sequentially and coincidentally executed according to a master task schedule to complete the task. For example, for a large company, a job scheduling system may be used to process its payroll payment. The payroll task may be broken down into the following processes: (i) access the company database for a list of the employees; (ii) execute a payroll program to identify salary payments to be made; (iii) execute a deposit program to make electronic bank deposits of the salary payments to the bank accounts of the employees; (iv) execute a report generator to print and send pay stubs to the employees. The payroll payment may be automated to occur at regular intervals. A job scheduling system utilizes a series of agents generally operating on computers to perform the smaller tasks. A workload manager controls each of the agents. The manager is connected to the agents using a communication network configured in a "star" pattern, with the workload manager at the center and each of the agents on a ray of the star.

In a network based system, agents operate on separate computers and each of the computers communicate to a central computer running the workload manager. IP is a commonly used communication protocol. The workload manager needs to track each agent for its status and job completion. When an agent has a fault, e.g. its communication link is broken, the workload manager must be able to recognize the fault and take corrective action, if possible. For example, upon the detection of a fault in an agent, a backup agent on a different computer may be brought in to take the place of the agent. With large systems having many tasks, it is a non-trivial exercise for the workload manager to track and manage the operation of all of the agents.

With a "star" network configuration, if the agents are allowed to move, there is a need to keep accurate data about the IP addresses of the agents. In practice it is a labor intensive task.

Failover of agents (i.e. providing backup for agents) is difficult to achieve because communication between agents and the workload manager is restricted to one instance of an agent and the workload manager. Further, it is difficult to maintain "shadow" agents and to re-assign schedules to different agents after a schedule has been created.

Under heavy load conditions, the workload manager may be overloaded with events. If it cannot process job events, they are queued and processing is delayed. This reduces overall productivity and reduces utilization of enterprise tools.

Also, the "star" architecture creates a performance bottleneck and a single point of failure. If the manager is down, no workload can be executed at all. Jobs that have to run at the time of failure will be delayed.

Centralized workload managers also provide a bottleneck and a single point of failure.

There is a need for a system and method which addresses deficiencies in the prior art.

SUMMARY

In a first aspect, a method for tracking and executing a job comprising tasks is provided. Each task is executable on a separate computing device. The method comprises: utilizing a workload manager to identify an initial schedule of implementation for the job; utilizing agents to selectively control execution of the tasks; and for each agent, utilizing a publish/subscription interface to isolate communications of the workload manager from each agent and to communicate with other publish/subscription interfaces of other agents to determine when to activate its task. The interface utilizes a broker to disseminate information to the other agents.

In the method, the publish/subscription interface may utilize a hop-by-hop communication scheme to communicate with other publish/subscription interfaces.

In the method, an overlay route table may define local communication links for said publish/subscription interface.

In another aspect, a system implementing any of the above noted aspects is provided.

In other aspects various combinations of sets and subsets of the above aspects are provided.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION

Figure 1:
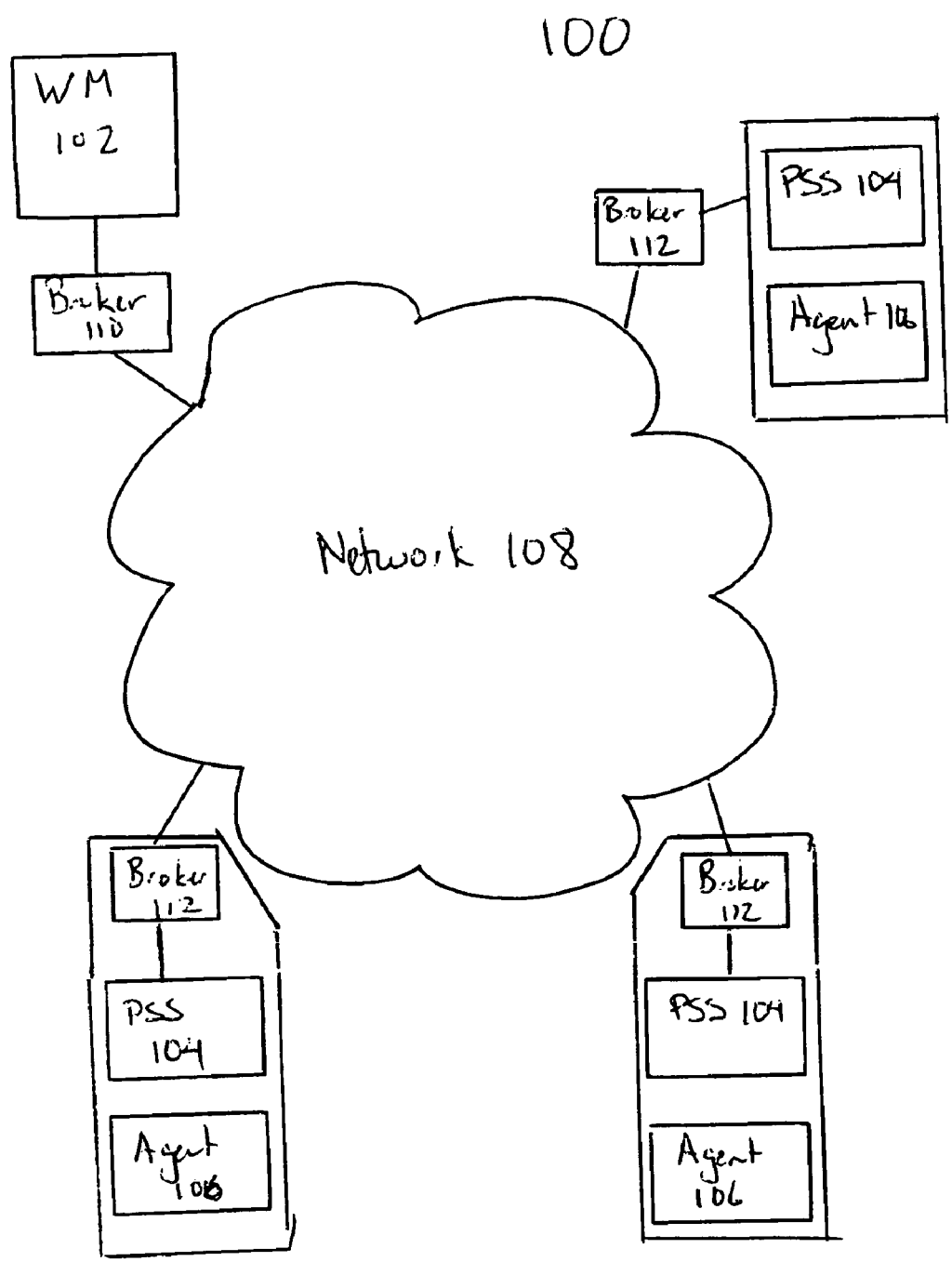
FIG. 1 illustrates a block diagram of a distributed job scheduler system providing an embodiment of the invention.

The description which follows, and the embodiments described therein, are provided by way of illustration of an example, or examples, of particular embodiments of the principles of the present invention. These examples are provided for the purposes of explanation, and not limitation, of those principles and of the invention. In the description, which follows, like parts are marked throughout the specification and the drawings with the same respective reference numerals.

In FIG. 1, system 100 illustrates an embodiment and comprises a workload manager (WM) 102, a series of publish/subscription systems (PSS) 104, collectively providing a federated PSS, and agents 106 all connected to network 108. Preferably, WM 102 communicates to system 100 through broker 110. A PSS 104 is associated each agent 106 and works to control operation of the applications of the agent. Preferably, each PSS 104 is associated with a broker 112 to interface between its agent and the remaining PSS 104s in the network 108. Where agents 106 are in a common network or association, their brokers 112 may have connections to one or more brokers 112 in that association or network. In one embodiment each of WM 102, PSS 104 and agents 106 is a software program and each operates on a separate computer. Each of WM 102, PSS 104 and agents 106 have access to internal and external data and databases (not shown). Communication between elements in system 100 may utilize messages created by a sender and sent over the respective links containing commands and data which can be extracted and acted upon by the recipient.

Briefly the federated PSS comprises a set of publish/subscribe brokers connected by a peer-to-peer overlay network. A broker is associated with PSS which is associated with each agent and provides a localized view of its subscriptions and publications as relating to its immediately connected neighbours. Clients connect to brokers using various binding interfaces.

Each PSS utilizes a publish/subscribe paradigm, where information producers submit data (as publications) to it and an information consumer (i.e., its agent) indicates its interests by submitting subscriptions to it. On receiving a publication from the network, the PSS determines whether it matches the data with the set of its agent's subscriptions, and notifies the agent, as appropriate. This arrangement provides decoupling of publishers and subscribers. This decoupling is useful for job scheduling, as the individual job monitors/controllers, or agents, are lightweight and potentially quite numerous. The address-free automatic content-based routing relieves WM 102 of the burden of maintaining connection state information and routing messages to and from all the agents.

In the embodiment, PSS 104 handles publishers of events received from neighbouring agents and subscriptions to (consumer of) events by the associated agent. The agent sends all subscriptions to its PSS 104. Subscriptions can be in the form of messages and contain any task names, status for tasks, any operating, function, geographic or other pertinent characteristic of the client. For example, the subscription can identify the network location of the client, the operating system resident on the client, the list of agent applications resident on the client, status information, information about its immediate neighbours, etc. Publications relate to a status of a task and its task name. For example, publications can relate to a failure of a task or a success of a task and can be published in a publish/subscribe system. Publishing client sends publications to its PSS 104 for dissemination through the network 108. Neighbouring publishing clients send publications to the PSS 104 of the agent. PSS 104 matches information extracted from publications to information extracted from subscriptions. When a match is found, the publication is forwarded to its agent. Otherwise, the information may be passed on to the immediate neighbours of the agent. A neighbouring agent can be configured to monitor for only specified publications. PSS 104 can maintain a status list for tasks sent by publishers to it. The status list tracks the tasks and whether its agent has subscribed to the tasks.

For the federated PSS, there is an overlay network connecting its brokers. This is the system through which the PSS communicate and traverse information through network 108. The overlay network defines relationships among all brokers and may be established in addition to the network connecting the agents. The overlay network is implemented as a set of unidirectional connections forming a foundation for message routing. Overlay routing data is stored in Overlay Routing Tables (ORT) on each client. An ORT for a client contains routing table information for its immediately connected neighbours. Collectively, all of the local ORTs define a logical ORT for all brokers in the network. Message routing can be based on a common publish-subscribe-advertise protocol. One implementation is a rule-based matching mechanism. The federated PSS uses a matching engine and routing engine to match and assign tasks to the client. One implementation of the matching engine and routine engine is a Rete-based rule engine as provided in the Java Expert System Shell.

There is also a subscriber route table (SRT) which is used to manage identification of subscribers amongst the brokers. It is a list of comprising information such as last hop, content specification, forwarding target list. Other implementations may be provided using a Rete via a rule engine.

Publications and advertisements to the federated PSS are merged before forwarding to reduce network traffic and routing table size. Publications and advertisements that overlap on content, destination, subject matter or any other parameter can be propagated as a single, more general advertisement.

Subscriptions are routed hop-by-hop amongst the brokers according to the SRT at each broker. The set of subscriptions seen by a broker are used to construct a Publication Routing Table (PRT) for that broker. Like the SRT, the PRT is a list of information such as last hop, content specification, forwarding target list. Collectively, all of the SRTs define a logical set of subscriptions for all agents in the network. Each SRT is preferably restricted to information relating to its local agent. Subscriptions are merged in the same manner as advertisements. Implementations may be provided using a Rete via a rule engine.

Figure 14:
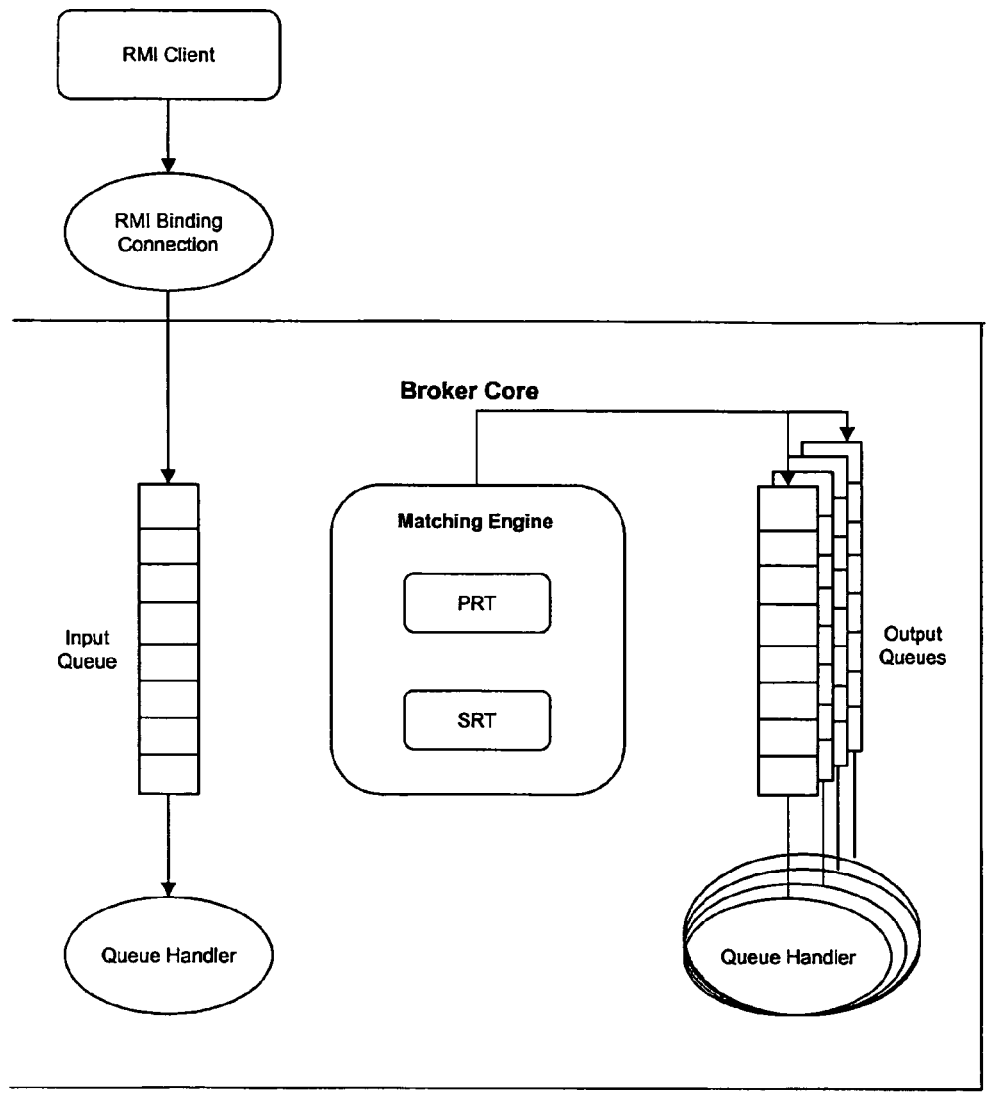
FIG. 14 illustrates further aspects of the publish/subscription system of FIG. 13.

Referring to FIG. 14, brokers are modular software components built on a set of queues. Each queue represents a unique message destination and has a message handler assigned to it. The message handlers are matching engine, broker controller and client bindings.

Figure 2:
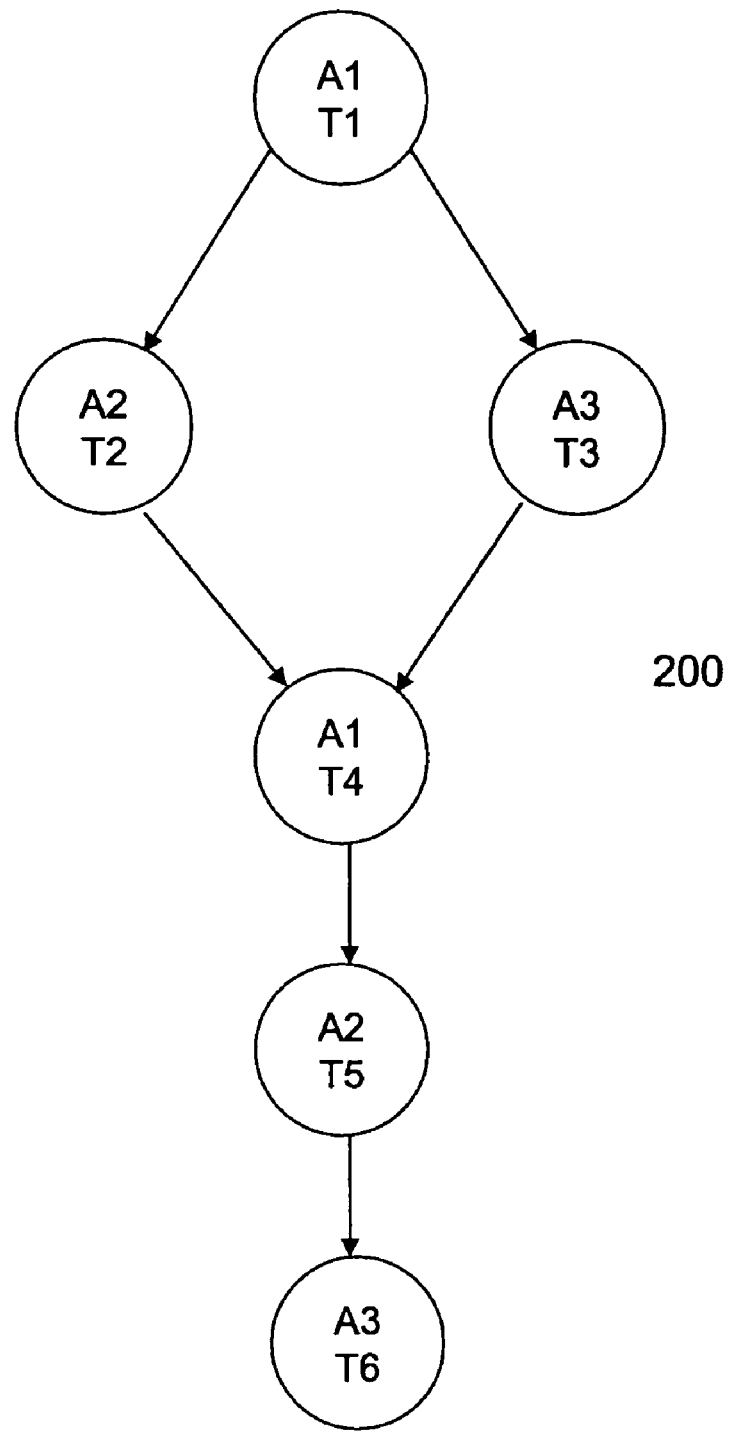
FIG. 2 illustrates an exemplary job provided to the system of FIG. 1 for scheduling and processing.

Referring to FIG. 2, exemplary job 200 is shown which is executed by system 100. Job 200 comprises tasks performed by agents A1, A2 and A3. At the top of job 200, Agent A1 performs its task T1 then tasks T2 and T3 are performed separately and simultaneously by agents A2 and A3. Upon successful completion of the tasks T2 and T3, a further task T4 is performed by agent A1. Subsequently, upon successful completion of task T4, task T5 is performed by agent A2 and upon successful completion of task T5, final task T6 is performed by agent A3. WM 102 and PSS 104 control activation of agents 104 for job 200.

Figure 3:
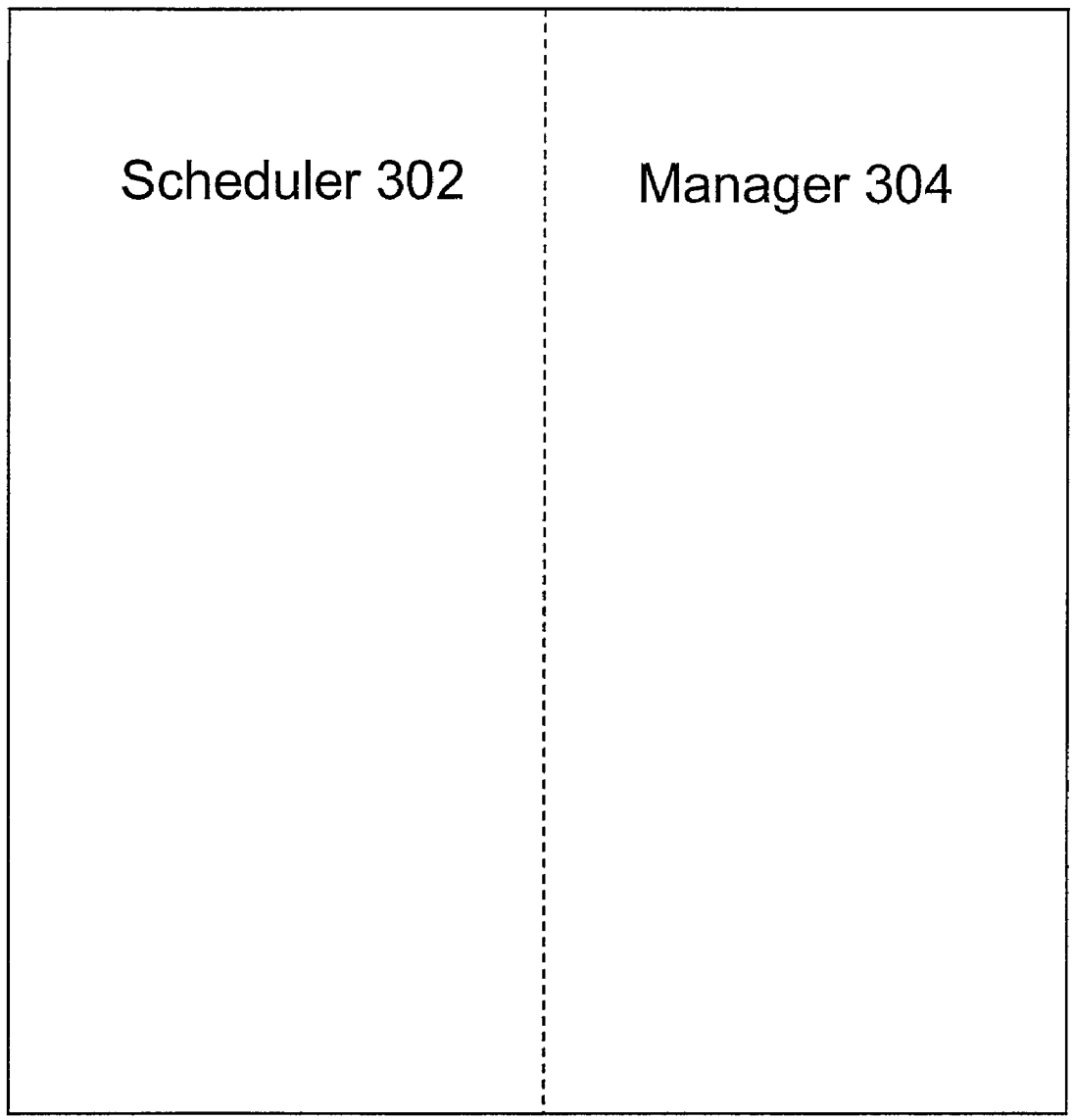
FIG. 3 illustrates a components of a workload manager of the job scheduler system of FIG. 1.

In FIG. 3, further detail on WM 102 is provided. WM 102 comprises scheduler 302 and manager 304. Scheduler 302 provides a database and scheduling routine to store tasks and defines a schedule and process for executing the stored tasks. Manager 304 evaluates conditions that have to be satisfied for execution of an element in the schedule and provides execution information in the form of publication information the network 108.

In defining a schedule for a job, such as job 200 (FIG. 2), a job graph associated with the job is defined and then converted into a series of subscriptions and publications. This conversion may be done using known publication/subscription conversion techniques known in the art.

Figure 4:
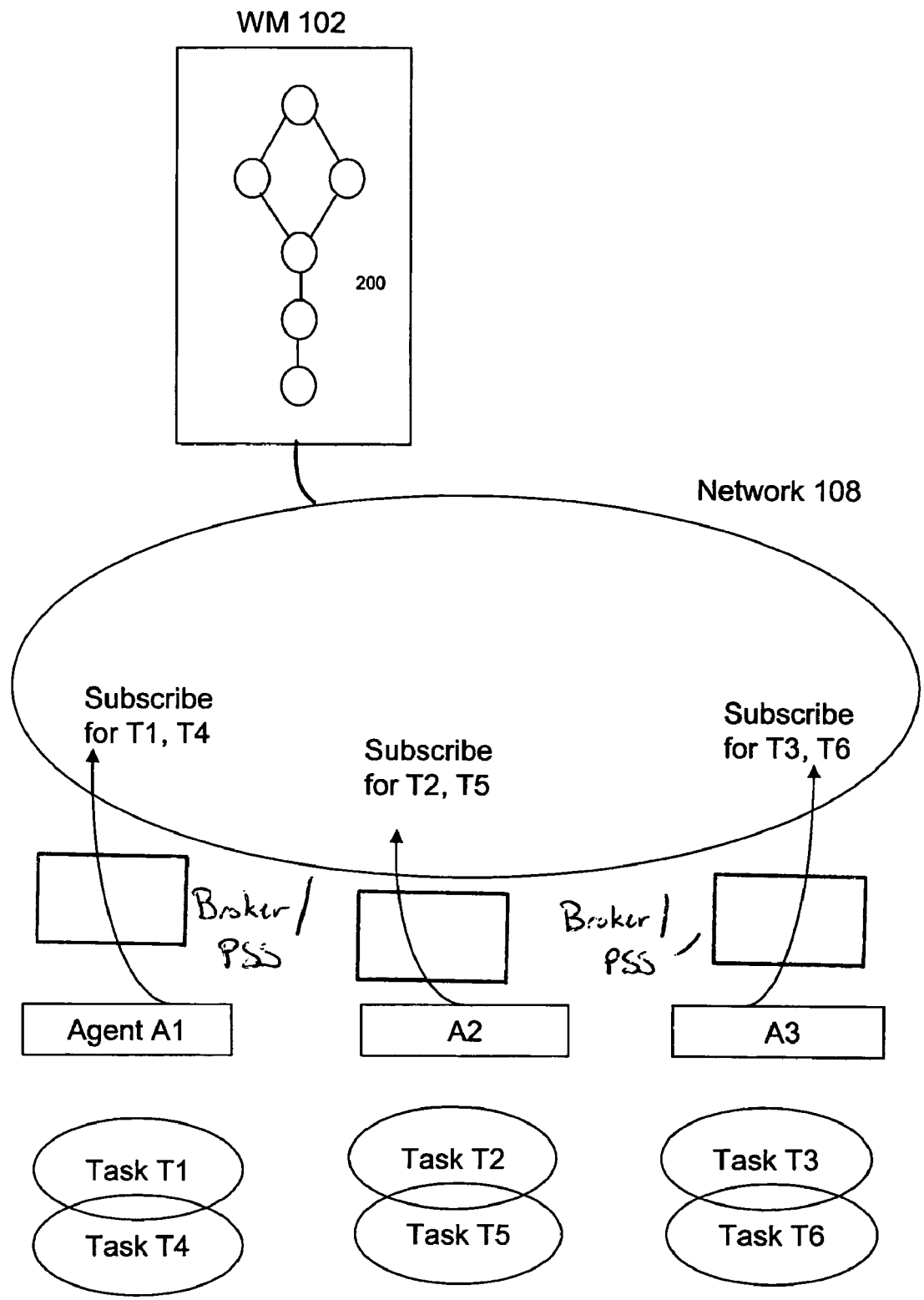
FIGS. 4-8 illustrate aspects of the job scheduler of FIG. 1 while processing the exemplary job of FIG. 2.
Figure 5:
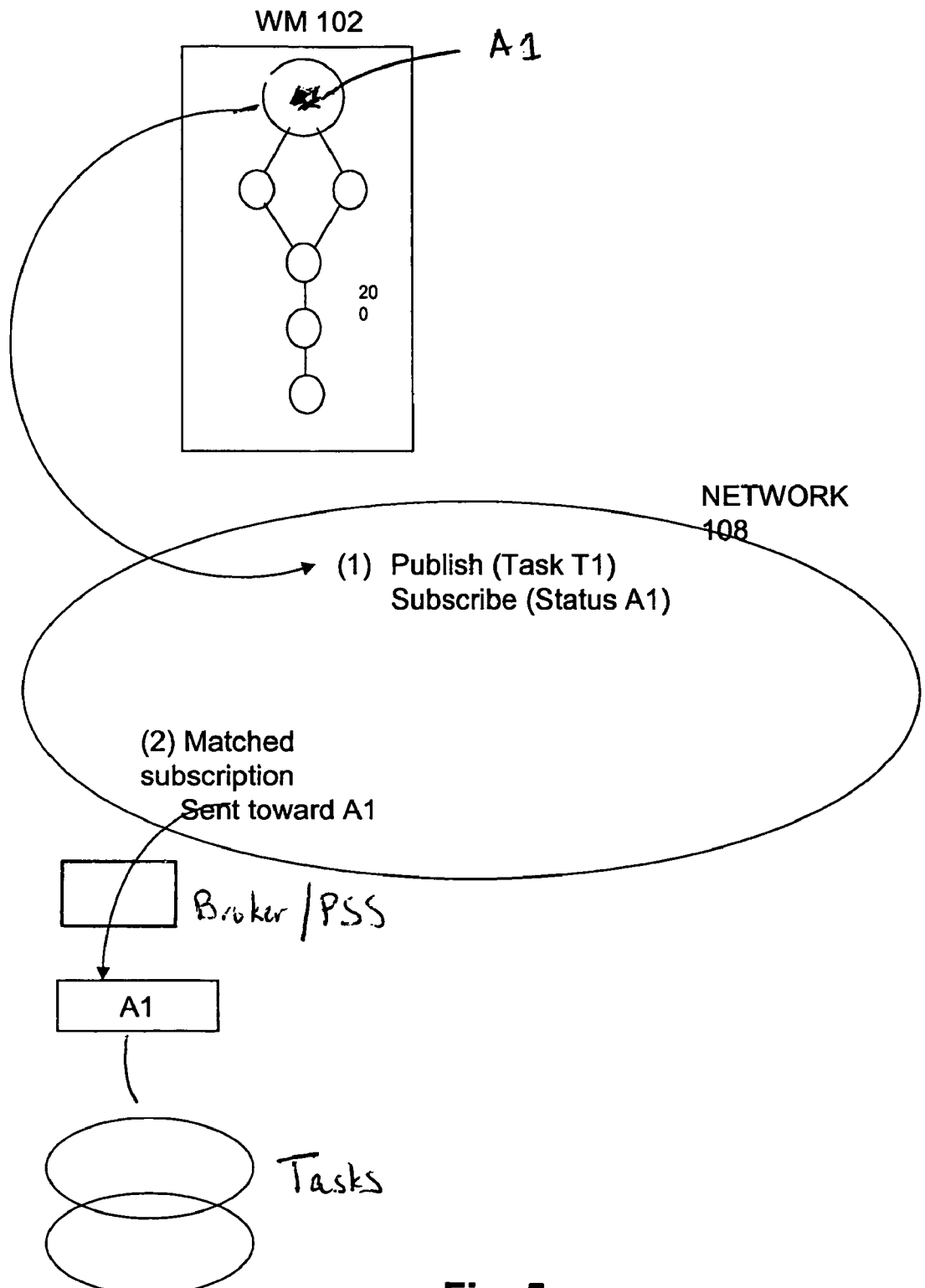
Figure 6:
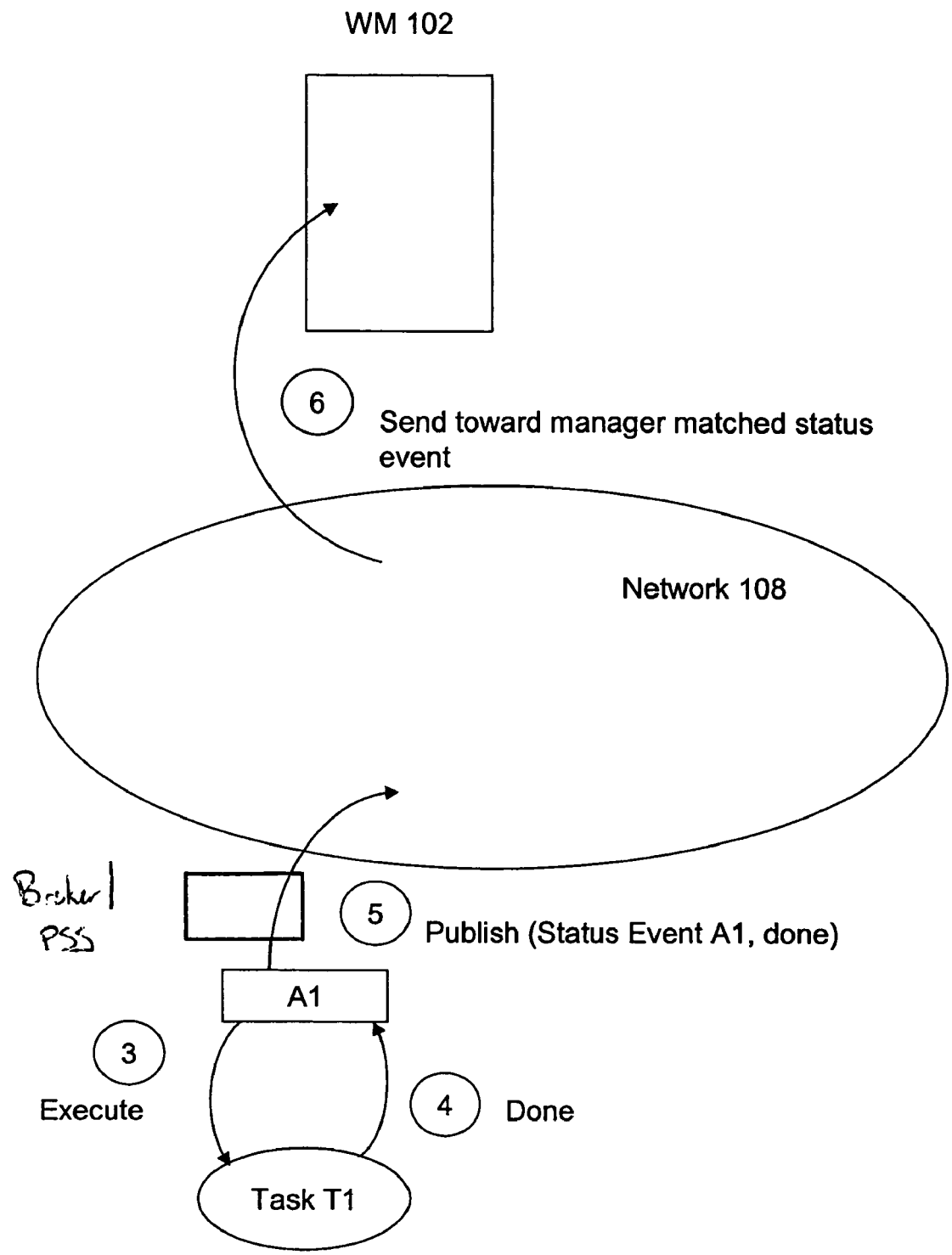
Figure 7:
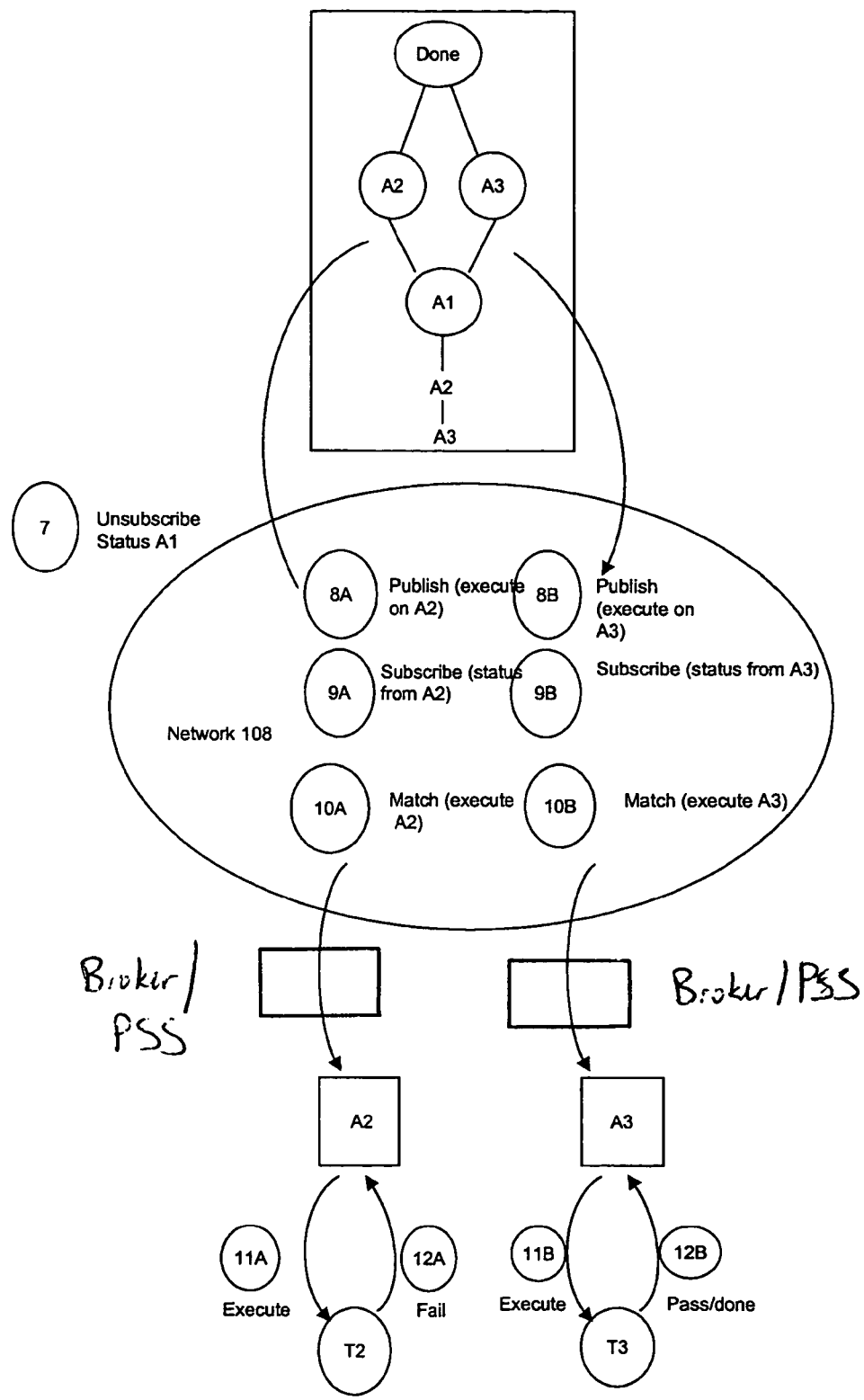
Figure 8:
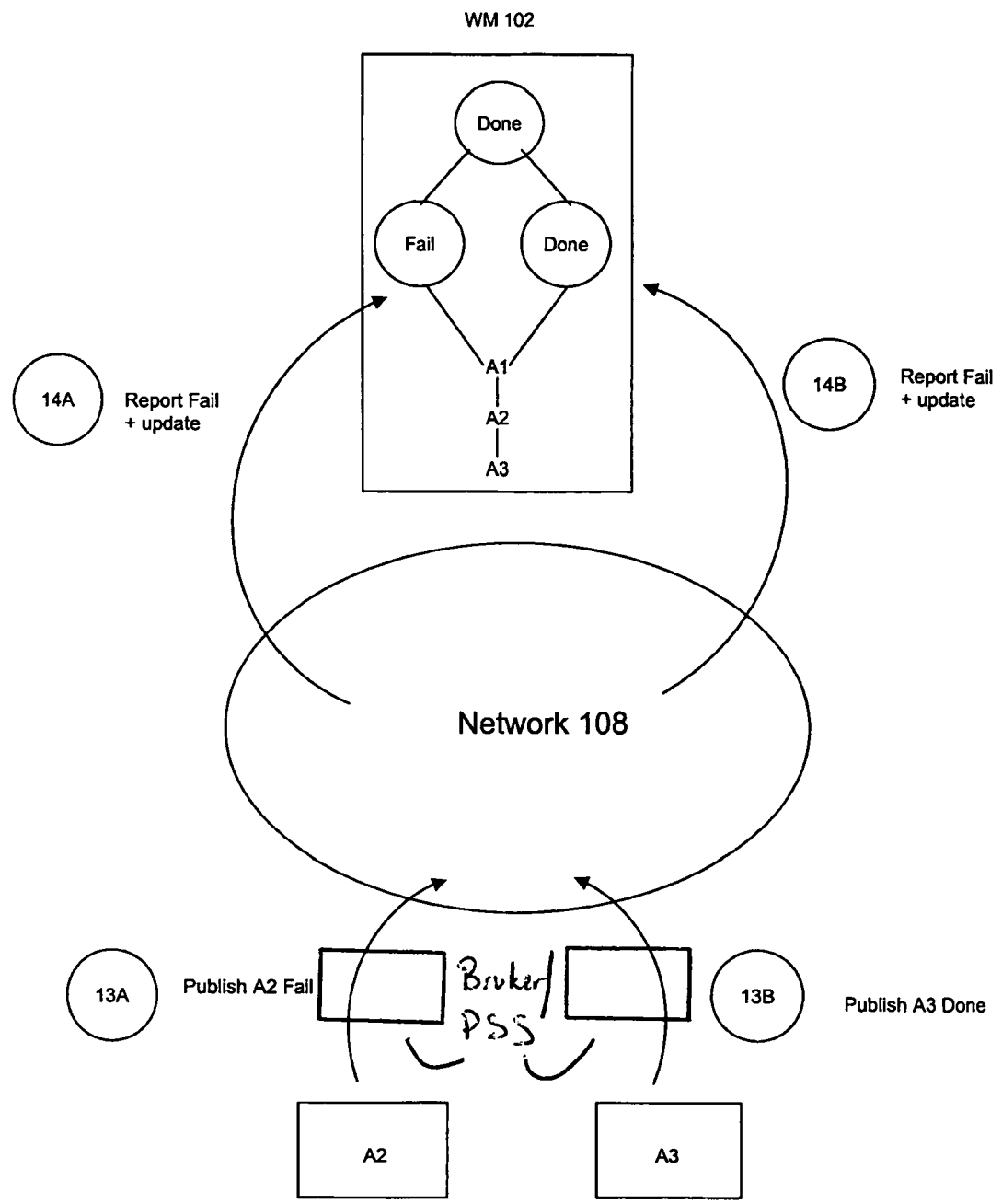
Figure 9:
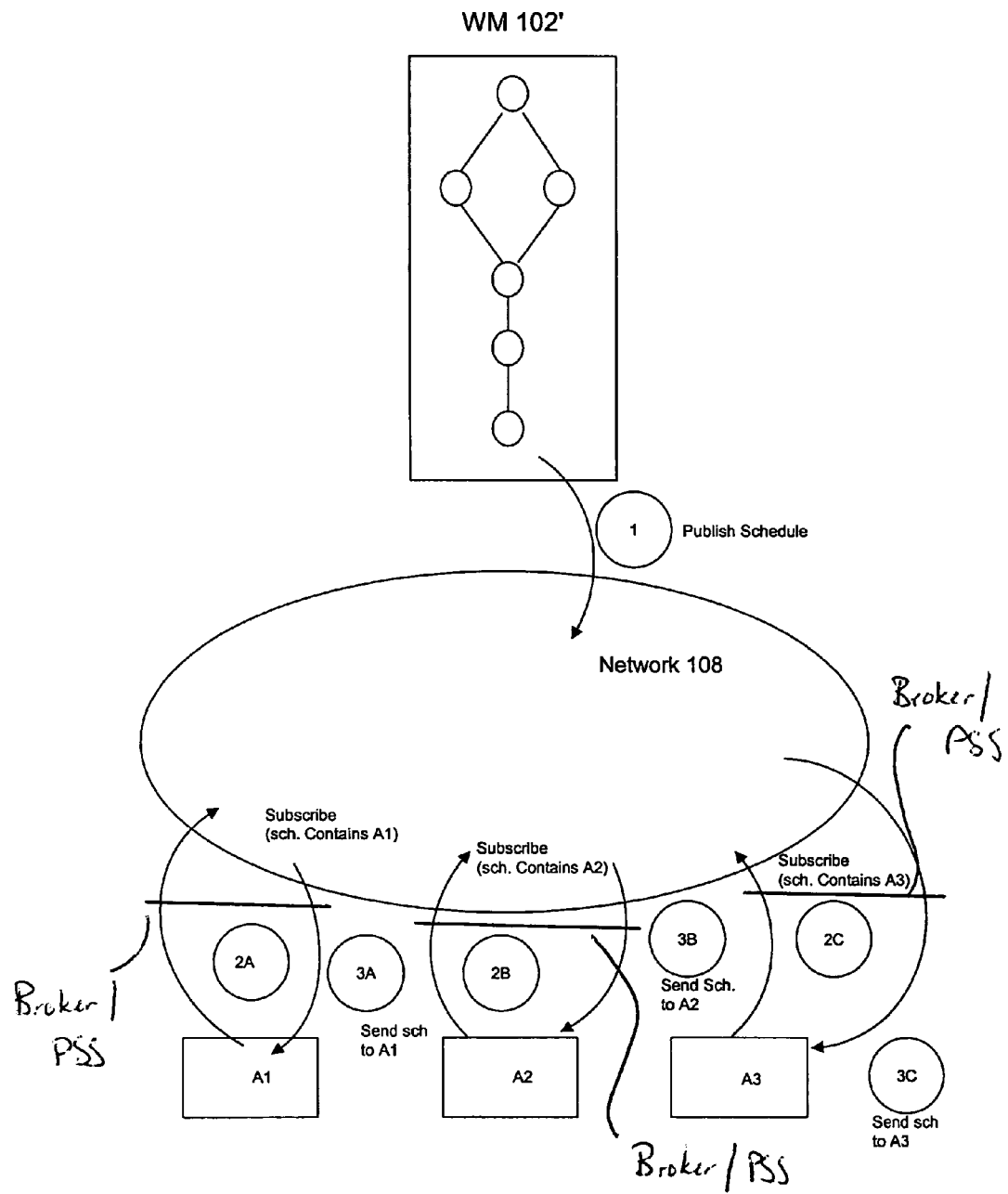
FIGS. 9-12 illustrate aspects of another embodiment of the job scheduler of FIG. 1 while processing a part of the exemplary job of FIG. 2.
Figure 10:
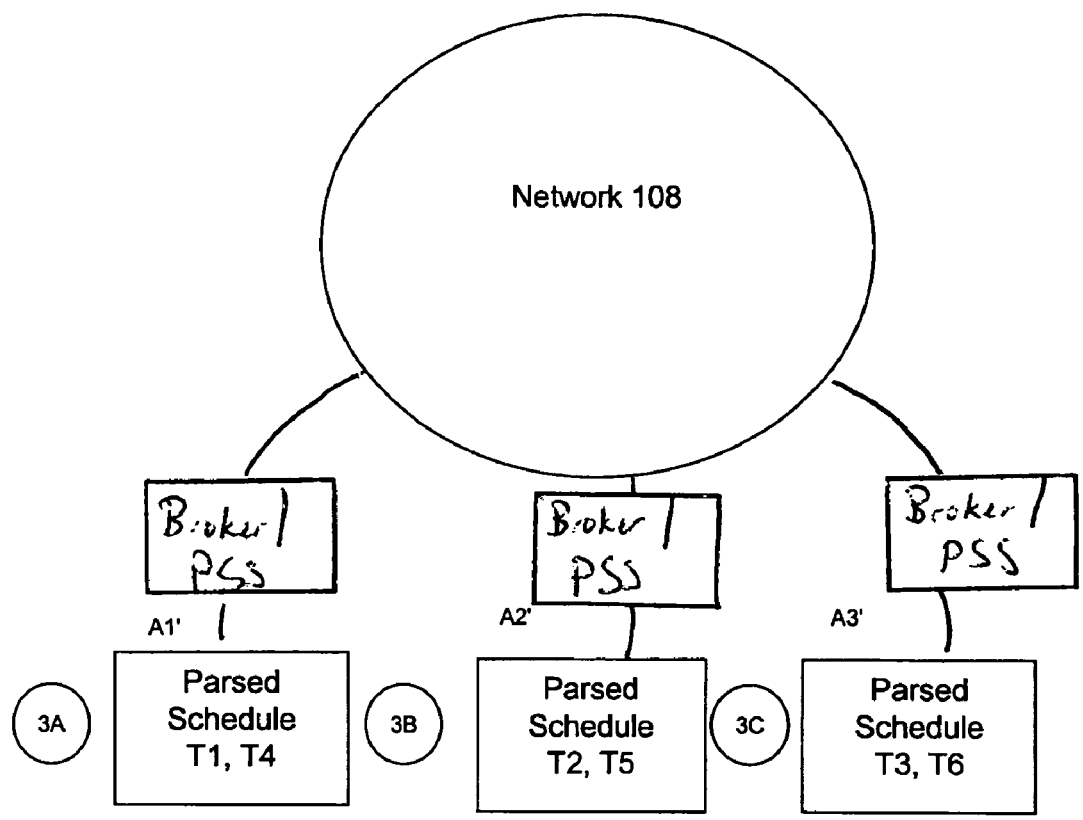
Figure 11:
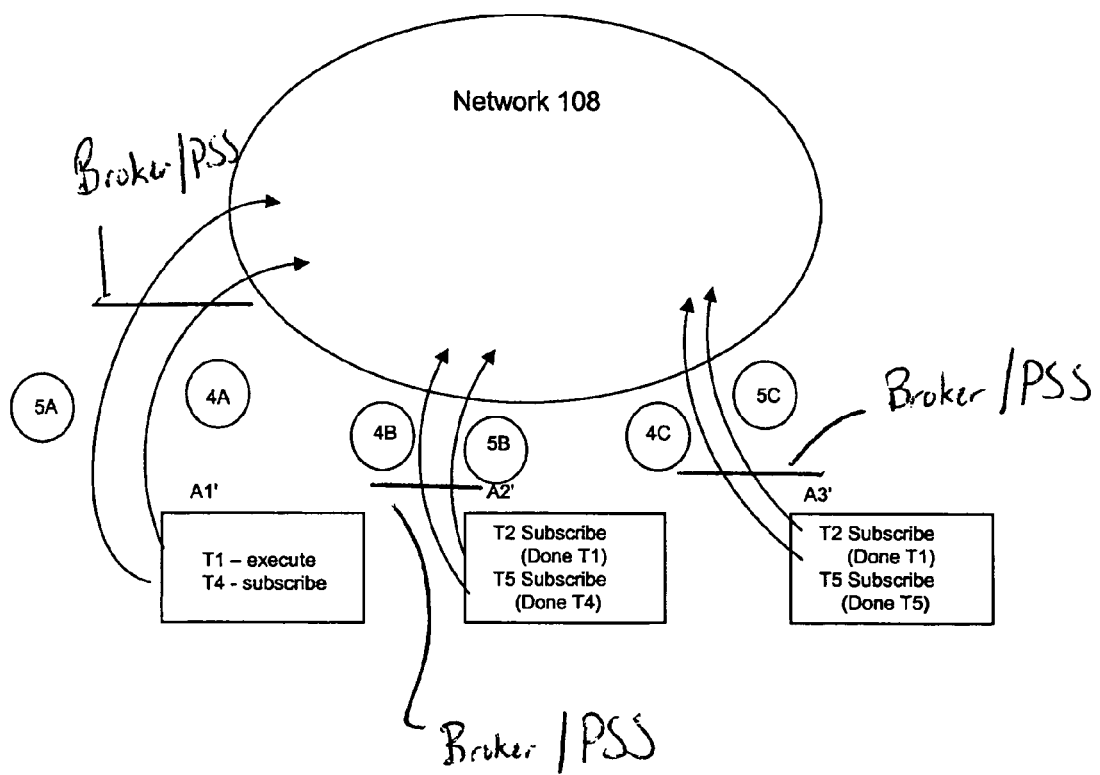
Figure 12:
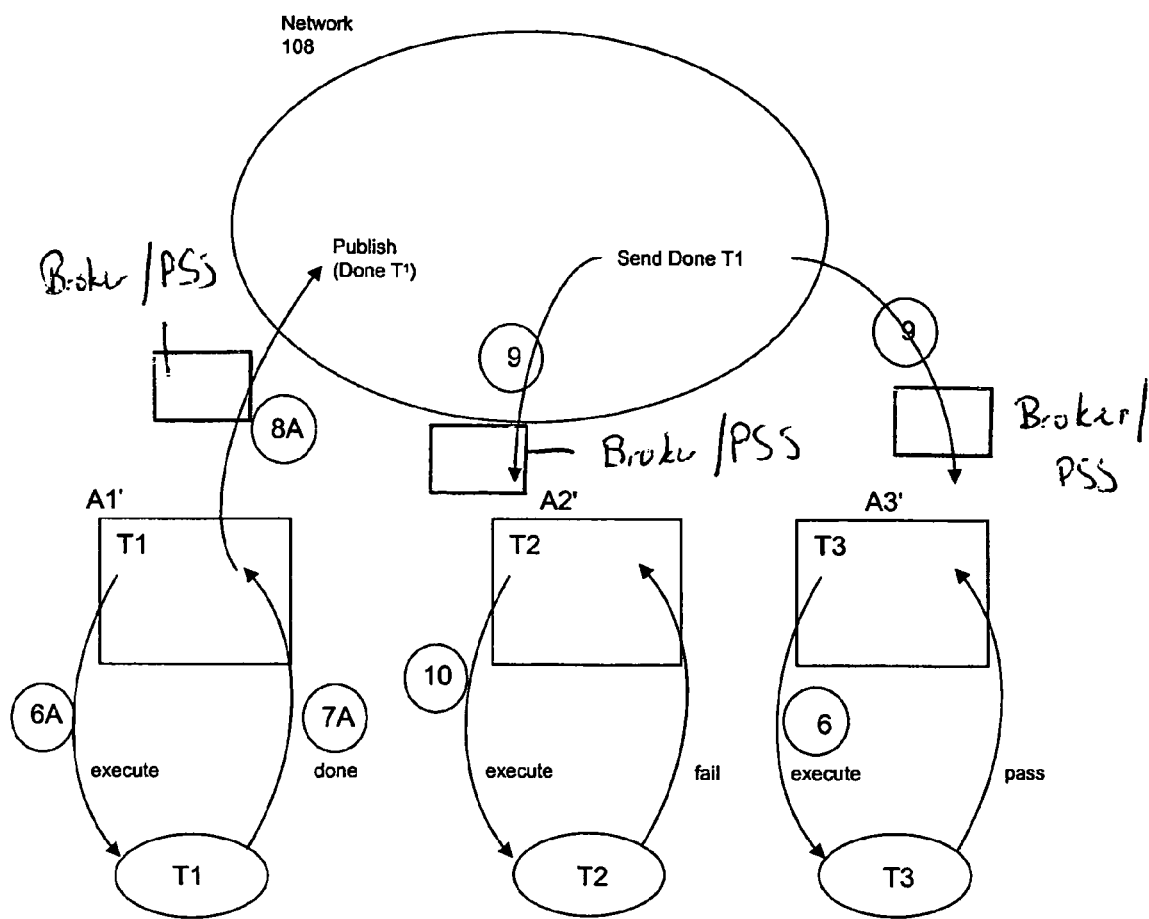

Referring to FIGS. 1-8 a description of an exemplary execution of job 200 is provided for the above noted configuration of WM 102. Referring to FIG. 4, at the first step, agents 106 each subscribe to their PSS 104 for commands to execute. The software at each agent 106 identifies which command it needs to be triggered to activate. Meanwhile, scheduler 302 has a process schedule relating to job 200. The process schedule defines the relationships among the defined publications and subscriptions for job 200. Job 200 is typically activated by an activation trigger (such as a timer signal). Upon receiving the activation trigger, scheduler 302 creates a schedule relating to job 200 and sends it to manager 304.

When manager 304 receives the schedule, it starts execution of the schedule by publishing to network 108 a command to execute Task T1. The ORT receives the command and it propagates, node-by-node, through the network until the identified target agent for the initiation task is reached. When each PSS receives the command, it reviews a status list for tasks and can determine that its agent has subscribed to Task T1. When the PSS 104 for agent A1 is reached, it recognizes the publication and sends a command to agent A1 to execute Task T1.

When agent A1 receives this command, it sends a command to its target to execute task T1. In the example, task T1 is successfully completed by the target and sends agent A1 a "DONE" message. Subsequently, Agent A1 receives the "DONE TASK T1" message from the target. In response to receiving that message, it publishes a "DONE TASK T1" message to PSS 104. PSS 104 receives the message and checks it against its status list. As there is a match in the list for Task T1 and sends a "DONE TASK T1" message to its PSS neighbours for further propagation through network 108. When the message is received by the broker for manager 304, manager 304 then marks task T1 as completed. A further instruction is provided destined for agent A1 to unsubscribe from task T1. When the instruction propagates through the network and reaches agent A1, its local PSS 104 unsubscribes task T1 from A1.

For the next step, manager 304 consults the schedule and publishes commands to A2 and A3 to execute tasks T2 and T3. At the same time manager 304 subscribes to a status list to receive messages from agents A2 and A3. The subscriptions are propagated through network 108 and when the PSS 104 for agents A2 and A3 are reached, they send messages execute tasks T2 and T3 to agents A2 and A3. Agents A2 and A3 receive the messages and send command to their respective targets to execute. In the example, target of agent A2 fails and sends failure indication to it. Meanwhile, target of agent A3 successfully completes and send a success message to agent A3. Upon receipt of the failure message, agent A2 publishes a corresponding failure message to its PSS 104. PSS 104 initiates propagation of the message through network 108. As manager 304 has subscribed to messages from agent A2, when it reaches manager 304, its broker provides it with the message. Meanwhile, agent A3 publishes a success message to network 108 through its PSS 104. Upon receipt of the each message, manager 304 marks task T2 for agent A2 as failed and task T3 for agent A3 as completed.

As task T2 has failed, in job 200, task T4 cannot be started. As such, the processing of job 200 ends without full completion. In other task arrangements, failure of some tasks may be tolerated.

Referring to FIGS. 1, 2 and 9-12, in another embodiment, functionality of manager 304 is ported into each agent 106. Agents A1, A2 and A3 subscribe to their PSS 104 for schedules that contain their names. Meanwhile, scheduler 302 creates a schedule with assignment of tasks for agents A1, A2 and A3.

For the next step in processing job 200, scheduler 302 publishes the schedule for job 200 with PSS 104' and PSS 104' sends schedule to agents A1, A2 and A3, as they are identified in the schedule.

Next, agents A1', A2' and A3' each parse the received schedule and select tasks that identify them as the active agent.

In the next step, agents A1', A2' and A3' process their respective tasks. The agents identify external, internal and environmental conditions required by their respective tasks. Agent A1' is used for tasks T1 and T4. For task T1, agent A1' identifies that all conditions are met and accordingly, sends a command to its target to execute task T1. For task T4, agent A1' cannot execute it until successful completion of both tasks T2 and T3. As such, it subscribes to the status list for tasks T2 and T3. Meanwhile, agent A2 identifies external condition for tasks T2 (which depends on the successful completion of task T1) and task T5 (which depends on the successful completion of task T4). As there are outstanding conditions not yet met, neither task can be executed and subscribes to the status list for tasks T1 and T4. Agent A3' identifies external conditions of task T3 (which depends on successful completion of task T1) and task T6 (which depends on the successful completion of task T5). As there are outstanding conditions not yet met, neither task can be executed and agent A3' subscribes to the status list for tasks T3 and T5.

In operation, once task T1 completes execution, it sends a success indication to agent A1'. Agent A1' sends a success status message to its PSS 104', which then propagates that message through network 108, searching for a match with any subscriptions wanted for agents A2' and A3'. Accordingly, eventually each local PSS 104' for agents A2' and A3' receive the message and then they each send status messages to their agents A2' and A3'. Agents A2' and A3' receive the status messages and both identify that conditions for T1 are met. As such, each agent A2' and A3' sends a command to execute respective tasks T2 and T3.

Presuming successful completion of tasks T2 and T3, each task sends a success indication to their agents and each agent sends success status message to their PSS 104'. Each PSS 104' then identifies a match with the subscription for agent A1'. Accordingly, each PSS 104' sends status messages to network 108 directed to agent A1'. Agent A1' receives the status messages and identifies that conditions for T4 are met. As such, agent A1' sends a command to execute task T4.

Presuming successful completion of task T4, it sends a success indication to agent A1 which then sends success status message to its PSS 104'. Its PSS 104' then identifies a match with the subscription for agent A2. Accordingly, its PSS 104' sends status messages to network 108 directed to agent A2'. Agent A2' receives the status messages and identifies that conditions for T5 are met. As such, agent A2' sends a command to execute task T5.

Finally, presuming successful completion of task T5, it sends a success indication to agent A2' which then sends success status message to its PSS 104'. Its PSS 104' then identifies a match with the subscription for agent A3'. Accordingly, its PSS 104' sends status messages to network 108 directed to agent A3'. Agent A3' receives the status messages and identifies that conditions for T6 are met. As such, agent A2' sends a command to execute task T6. Upon completion of task T6, agent A2' sends a status message to its PSS 104', which then recognizes that job 200 is completed and sends a status message to network 108 directed to scheduler 302'.

It will be appreciated that the order of scheduling, subscribing and reporting messages to and from each PSS 104' and each PSS 104 may be provided in any order, as long as the continuity of the scheduled job is maintained.

Figure 13:
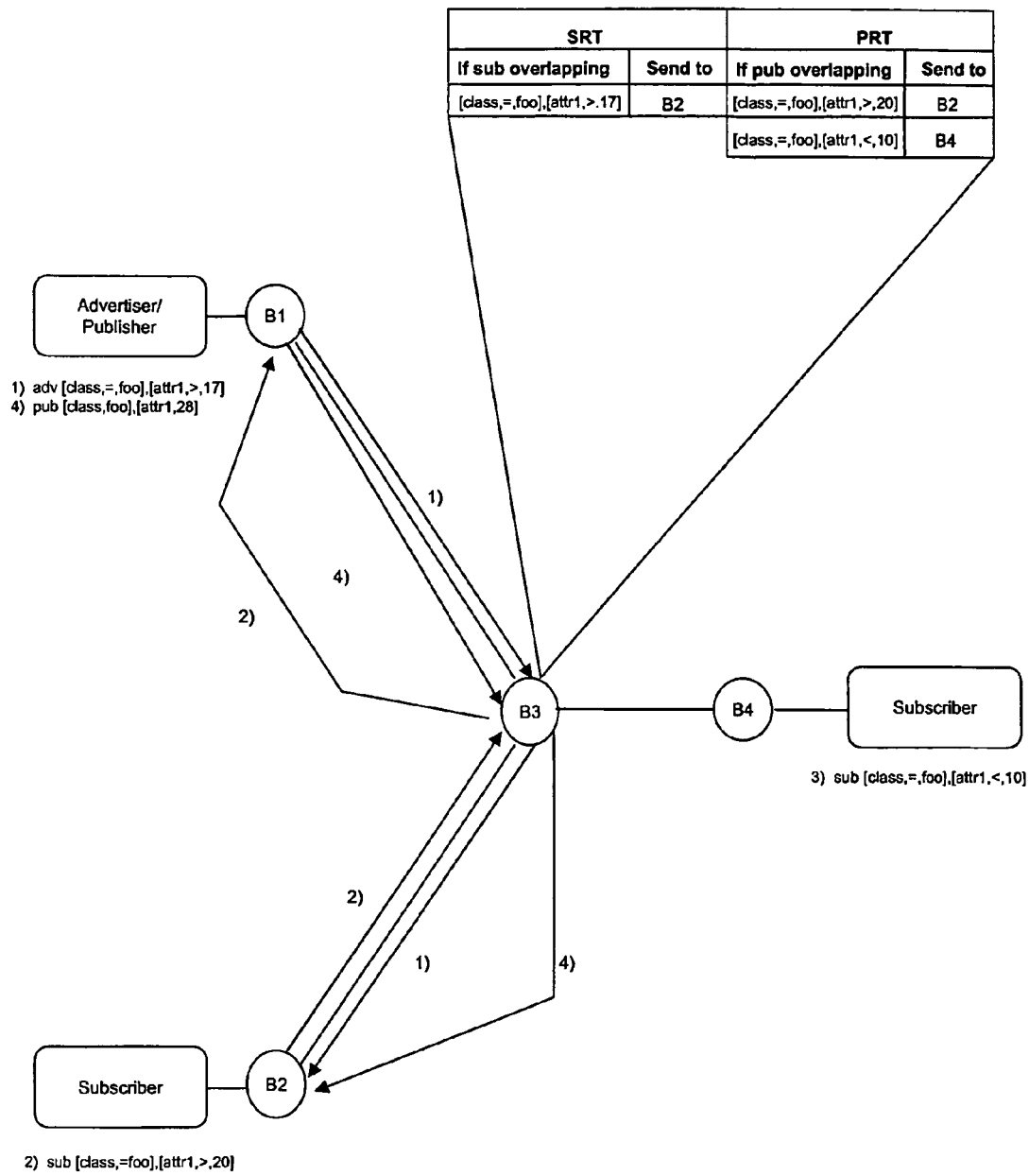
FIG. 13 illustrates aspects of the publish/subscription system of the system of FIG. 1.

Referring to FIGS. 13 and 14, further detail is provided on the federated, time-sensitive, and historic data management (providing read/write access), content-based publish/subscribe system of each PSS.

The federated PSS utilizes a historic data access scheme providing transparency and flexibility. In a standard subscription model, a specified time range may be in the future and does not provide for historic time ranges. The embodiment does allow for historic time ranges. All operators allowed in standard subscriptions are also allowed in historic subscriptions.

Databases for the historic model are attached to the brokers as clients through the database binding. Each database maintains a subscription with an appropriate predicate, such as [class, =, DB CONTROL]. A user can cause a database to begin storing certain publications by issuing an appropriate command as a publication, such as

[class, DB CONTROL], [command, STORE], [content spec, "[class, =, foo]"].

In such a construct, the database will advertise [class, _, foo] and begin storing publications containing [class, foo], while also converting them to SQL INSERT statements.

If a user submits a subscription after a noted time interval, the database will receive the subscription (since it matches the database's advertisement), perform an SQL SELECT for the appropriate publications, and republish the stored publications from the noted time interval. Since all messages are routed using a content based algorithm, direct queries to a database for past data is generally not possible. In a further embodiment, when historic data access scheme is based on a PADRES scheme, since it is built entirely on top of publish/subscribe semantics, will use content-based routing path found by the standard PADRES routing algorithm.

It will be appreciated that the federated PSS provides improved fault tolerance, load balancing, distribution of information, time awareness and subscription management.

Although the invention has been described with reference to certain specific embodiments, various modifications thereof will be apparent to those skilled in the art without departing from the scope of the invention as outlines in the claims appended hereto. It will be further apparent to those skilled in the art that various embodiments of the invention may be made in hardware, firmware, software, or various combinations thereof. For example, various embodiments may be implemented in a computer readable storage medium containing computer executable instructions that can be read and executed on one or more processing devices. In particular, the computer readable storage medium may generally include any suitable mechanism for storing information in a form that can be read on a computer, including read only memory, random access memory, magnetic disk storage media, optical storage media, flash memory devices, or any other tangible media suitable for storm information. Additionally, while firmware, software, routines, or instructions may be described in the above disclosure in terms of specific exemplary embodiments and performing certain actions, it will be apparent that such descriptions are merely for the sake of convenience and that such actions in fact result from computing devices, processing devices, processors, controllers, or other devices executing the firmware, software, routines, or instructions.

We claim:

1. A method for distributed job scheduling, comprising:
defining a schedule including a plurality of commands that will execute the job, wherein the job comprises a first task scheduled to be executed on a first computing device and a second task scheduled to be executed on a second computing device, wherein the first task and the second task are defined in the schedule to complete execution for the job;
subscribing a first agent executing on the first computing device to the first task and subscribing a second agent executing on the second computing device to the second task;
publishing a first one of the plurality of commands to a first broker that interfaces with the first agent executing on the first computing device, wherein the first broker forwards the first command to the first agent in response to the first agent subscribing to the first task, and wherein the first agent executes the first task on the first computing device in response to receiving the first command from the first broker;
generating a first publication associated with the execution of the first task using the first agent, wherein the first publication indicates whether the execution of the first task succeeded or failed;
unsubscribing the first agent from the first task in response to the first publication indicating that the execution of the first task succeeded;
publishing a second one of the plurality of commands to a second broker that interfaces with the second agent executing on the second computing device in response to the first publication indicating that the execution of the first task succeeded, wherein the second broker forwards the second command to the second agent in response to the second agent subscribing to the second task, and wherein the second agent executes the second task on the second computing device in response to receiving the second command from the second broker;
generating a second publication associated with the execution of the second task using the second agent, wherein the second publication indicates whether the execution of the second task succeeded or failed; and
generating a message indicating whether the execution of the job succeeded based on the first publication and the second publication, wherein the message indicates that the execution of the job succeeded in response to the first publication indicating that the execution of the first task succeeded and the second publication indicating that the execution of the second task succeeded.

2. The method of claim 1, wherein the job further comprises a third task scheduled to be executed on a third computing device, and wherein the method further comprises:
subscribing a third agent executing on the third computing device to the third task;
publishing a third one of the plurality of commands to a third broker that interfaces with the third agent executing on the third computing device in response to the first publication indicating that the execution of the first task succeeded, wherein the third broker forwards the third command to the third agent in response to the third agent subscribing to the third task, and wherein the third agent executes the third task on the third computing device in response to receiving the third command from the third broker; and generating a third publication associated with the execution of the third task using the third agent, wherein the third publication indicates whether the execution of the third task succeeded or failed, wherein the message indicating whether the execution of the job succeeded is further based on the third publication.

3. The method of claim 1, wherein a workflow manager publishes the first command to the first broker in response to a scheduler receiving an activation trigger for the schedule, whereby the activation trigger initiates the execution of the job.

4. The method of claim 1, wherein defining the schedule includes converting a job graph associated with the job into a series of publications and subscriptions that are used to route the plurality of commands.

5. A computer readable storage medium storing computer executable instructions for distributed job scheduling, wherein executing the computer executable instructions on a computing device cause the computing device to:

define a schedule including a plurality of commands that will execute the job, wherein the job comprises a first task scheduled to be executed on a first computing device and a second task scheduled to be executed on a second computing device, wherein the first task and the second task are defined in the schedule to complete execution for the job;

subscribe a first agent executing on the first computing device to the first task and subscribing a second agent executing on the second computing device to the second task;

publish a first one of the plurality of commands to a first broker that interfaces with the first agent executing on the first computing device, wherein the first broker forwards the first command to the first agent in response to the first agent subscribing to the first task, and wherein the first agent executes the first task on the first computing device in response to receiving the first command from the first broker;

generate a first publication associated with the execution of the first task using the first agent, wherein the first publication indicates whether the execution of the first task succeeded or failed;

unsubscribe the first agent from the first task in response to the first publication indicating that the execution of the first task succeeded;

publish a second one of the plurality of commands to a second broker that interfaces with the second agent executing on the second computing device, wherein the second broker forwards the second command to the second agent in response to the second agent subscribing to the second task, and wherein the second agent executes the second task on the second computing device in response to receiving the second command from the second broker;

generate a second publication associated with the execution of the second task using the second agent, wherein the second publication indicates whether the execution of the second task succeeded or failed;

unsubscribe the second agent from the second task in response to the second publication indicating that the execution of the second task succeeded; and generate a message indicating whether the execution of the job succeeded based on the first publication and the second publication, wherein the message indicates that the execution of the job succeeded in response to the first publication indicating that the execution of the first task succeeded and the second publication indicating that the execution of the second task succeeded.

6. The computer readable storage medium of claim 5, wherein the execution of the second task occurs subsequent to the execution of the first task completing.

7. The computer readable storage medium of claim 5, wherein the first task and the second task are executed substantially simultaneously.

8. The computer readable storage medium of claim 6, wherein the execution of the second task occurs in response to the first publication indication that the execution of the first task succeeded.

9. The computer readable storage medium of claim 5, wherein a workflow manager publishes the first command to the first broker in response to a scheduler receiving an activation trigger for the schedule, whereby the activation trigger initiates the execution of the job.

10. The computer readable storage medium of claim 5, wherein defining the schedule includes converting a job graph associated with the job into a series of publications and subscriptions that are used to route the plurality of commands.

11. A system for distributed job scheduling, the system comprising one or more networked computing devices configured to:

define a schedule including a plurality of commands that will execute the job, wherein the job comprises a first task scheduled to be executed on a first computing device and a second task scheduled to be executed on a second computing device, wherein the first task and the second task are defined in the schedule to complete execution for the job;

subscribe a first agent executing on the first computing device to the first task and subscribing a second agent executing on the second computing device to the second task;

publish a first one of the plurality of commands to a first broker that interfaces with the first agent executing on the first computing device, wherein the first broker forwards the first command to the first agent in response to the first agent subscribing to the first task, and wherein the first agent executes the first task on the first computing device in response to receiving the first command from the first broker;

generate a first publication associated with the execution of the first task using the first agent, wherein the first publication indicates whether the execution of the first task succeeded or failed;

unsubscribe the first agent from the first task in response to the first publication indicating that the execution of the first task succeeded;

publish a second one of the plurality of commands to a second broker that interfaces with the second agent executing on the second computing device, wherein the second broker forwards the second command to the second agent in response to the second agent subscribing to the second task, and wherein the second agent executes the second task on the second computing device in response to receiving the second command from the second broker;

generate a second publication associated with the execution of the second task using the second agent, wherein the second publication indicates whether the execution of the second task succeeded or failed;

unsubscribe the second agent from the second task in response to the second publication indicating that the execution of the second task succeeded; and generate a message indicating whether the execution of the job succeeded based on the first publication and the second publication, wherein the message indicates that the execution of the job succeeded in response to the first publication indicating that the execution of the first task succeeded and the second publication indicating that the execution of the second task succeeded.

12. the system of claim 11, wherein the execution of the second task occurs subsequent to the execution of the first task completing.

13. The system of claim 11, wherein the first task and the second task are executed substantially simultaneously.

14. The system of claim 12, wherein the execution of the second task occurs in response to the first publication indication that the execution of the first task succeeded.

15. The system of claim 11, wherein a workflow manager publishes the first command to the first broker in response to a scheduler receiving an activation trigger for the schedule, whereby the activation trigger initiates the execution of the job.

16. The system of claim 11, wherein defining the schedule includes converting a job graph associated with the job into a series of publications and subscriptions that are used to route the plurality of commands.

17. The method of claim 1, wherein the first broker and the second broker are connected in an overlay network that defines a relationship between the first broker and the second broker.

18. The method of claim 17, further comprising storing overlay routing data for the overlay network in a first overlay routing table at the first computing device and a second overlay routing table at the second computing device, wherein the first overlay routing table and the second overlay routing table respectively include routing information defining neighbors of the first computing device and neighbors of the second computing device.

19. The method of claim 18, wherein publishing the first command to the first broker includes propagating the first command node-by-node along the overlay network using the routing information from the one or more of the overlay routing tables.

20. The method of claim 2, wherein the second task and the third task are executed substantially simultaneously.

21. The method of claim 20, wherein the job further comprises a fourth task scheduled to be executed on a fourth computing device, and wherein the method further comprises:

subscribing a fourth agent executing on the fourth computing device to the fourth task;

unsubscribing the second agent from the second task in response to the second publication indicating that the execution of the second task succeeded and unsubscribing the third agent from the third task in response to the third publication indicating that the execution of the third task succeeded;

publishing a fourth one of the plurality of commands to a fourth broker that interfaces with the fourth agent executing on the fourth computing device, wherein the fourth broker forwards the fourth command to the fourth agent in response to the fourth agent subscribing to the fourth task, and wherein the fourth agent executes the fourth task on the fourth computing device in response to receiving the fourth command from the fourth broker; and generating a fourth publication associated with the execution of the fourth task using the fourth agent, wherein the fourth publication indicates whether the execution of the fourth task succeeded or failed, wherein the message indicating whether the execution of the job succeeded is further based on the fourth publication.

22. The method of claim 21, wherein the fourth command is published to the fourth broker in response to one or more of the second publication indicating that the execution of the second task succeeded or the third publication indicating that the execution of the third task succeeded, whereby the execution of the fourth task tolerates one of the second publication indicating that the execution of the second task failed or the third publication indicating that the execution of the third task failed.

* * * * *